(12) United States Patent
Chen

(10) Patent No.: US 6,275,002 B1
(45) Date of Patent: Aug. 14, 2001

(54) ROTARY CHARGING PLUG STRUCTURE OF A CHARGER

(75) Inventor: Sheng Chia Chen, KaoHsiung (TW)

(73) Assignee: Son Kon Co., Ltd., Kaoshiung (TW)

( * ) Notice: Subject to any disclaimer, the term of this patent is extended or adjusted under 35 U.S.C. 154(b) by 0 days.

(21) Appl. No.: 09/768,842

(22) Filed: Jan. 23, 2001

(51) Int. Cl.[7] .................................................. H01M 10/46
(52) U.S. Cl. ............................................ 320/111; 439/131
(58) Field of Search ................................... 320/107, 111, 320/112, 113, 114, 115; 439/131, 172

(56) References Cited

U.S. PATENT DOCUMENTS

| | | | |
|---|---|---|---|
| 4,922,178 | * | 5/1990 | Matuszewski et al. .............. 320/111 |
| 5,057,381 | * | 10/1991 | Persen ................................... 320/111 |
| 5,525,888 | * | 6/1996 | Toya ...................................... 320/111 |
| 5,635,814 | * | 6/1997 | Afzal et al. ........................... 320/111 |
| 5,684,378 | * | 11/1997 | Furth et al. ....................... 320/111 X |

\* cited by examiner

*Primary Examiner*—Edward H. Tso
(74) *Attorney, Agent, or Firm*—Pro-Techtor International Services

(57) ABSTRACT

This invention is related to a rotary charging plug structure of a charger, having: an upper lid to be matched with a lower lid so as to receive a circuit board therein, the lower lid being provided with a receiving chamber therein for receiving a blade base. The blade base is provided with two blades and shafts at each of opposing ends thereof. The shafts are each formed with an annular grove at a top end thereof for being integrally riveting to the shafts and includes the two stop blocks and a protruding block. The rear lid covers and urges against the blade base after placing the blade and the conductive plates into the receiving chamber. The rear lid includes a guide block at a center thereof to allow sliding movement of the protruding block of the blade base. Each of the through-holes and the guide block are provided with a push block therebetween for urging against the shafts. As such, the blades can be rotated within a 90° range. Further, the blades are prevented from disengagement upon experiencing a frontal or a lateral impact. This invention is also simple in its structure so as to reduce the manufacturing and assembly cost.

6 Claims, 5 Drawing Sheets

ROTARY CHARGING PLUG STRUCTURE OF A CHARGER

FIELD OF INVENTION

This invention is related to a rotary charging plug structure of a charger, in particular to one that uses a blade base integrally formed by riveting blades to a shaft so as to prevent the blades from disengagement upon experiencing a frontal or a lateral impact.

BACKGROUND OF INVENTION

A conventional rotary charging plug structure of a charger, such as that disclosed in ROC (Taiwan) Patent Application No. 82201253 entitled "Improved Rotary Charging Plug Structure of a Charger" (as shown in FIGS. 1 and 2), mainly comprises a housing 100 having walls, and a plug structure 200. The housing 100 includes a substantially L-shaped notch 110 that is formed with openings 120. The two openings 120 are formed therebetween with a receiving slot 130 for receiving an urging element 140. The receiving slot 130 is formed at a bottom thereof with a blind hole 150 at a location corresponding to where the urging element 140 is provided. The blind hole 150 may be provided with a spring 160 therein. The urging element 140 is further formed at an outer end thereof with a semi-circular protrusion 141. The plug structure 200 includes a horizontal shaft 210, two coupling plates 220, and blades 230. The coupling plates 220 and the shaft 210 are integrally joined to one another by riveting so as to allow free rotation with respect to one another. The coupling plates 220 are inserted and retained within the notch 110 of the housing 100. The horizontal shaft 210 is inserted between the two coupling plates 220 and blades 230. The horizontal shaft 210 is formed with keyways 210 at each of opposing ends thereof for engaging with another ends of the blades 230 and rotating along with the blades 230. The horizontal shaft 210 is formed with a semi-circular groove 211 at a location corresponding to the semi-circular protrusion 141 of the urging element 140 so as to prevent the semi-circular groove 211 and the semi-circular protrusion 211 from disengagement when the horizontal shaft 210 rotates along with the blades 230 about a tip of the semi-circular protrusion 141.

The above structure, however, consists of the following disadvantages:

1. Because the horizontal shaft is inserted after the coupling plates are integrally joined to the blades by riveting, a frontal or a lateral impact applied to the blades may cause disengagement of the semi-circular protrusion 141, the spring 160, or the keyways 212 thereby causing inconvenience in use.

2. Such a structure consists a great number of components, which increases manufacturing cost arisen from production, component management, and assembly.

3. In use, the blades must be directly inserted into the slots of a receptacle; any slight deviation in orientation may cause the blades to flip upwards to their storage positions thereby causing much incontinence.

4. Due to prolonged use, the indoor or outdoor humidity may result in elastic deformation or rust of the spring thereby causing failure of its original function.

In view of the above disadvantages, multiple trails and experiments are performed to obtain the rotary charging plug structure of a charger of this invention.

SUMMARY OF INVENTION

It is a primary object of this invention to provide a rotary charging plug structure of a charger, using a blade base by integrally riveting blades to a shaft and support provided by a rear lid, so as to prevent the blades from disengagement upon experiencing a frontal or a lateral impact, and to eliminate failure caused by environmental humidity.

It is another object of this invention to provide a rotary charging plug structure of a charger having a simple, easily assembled structure so as to reduce manufacturing and assembly cost.

It is a further object of this invention to provide the blades with three retaining positions so as to facilitate easy application.

In order to achieve the above objects, this invention discloses a rotary charging plug structure of a charger, comprising: an upper lid to be matched with a lower lid so as to receive a circuit board therein, the lower lid being provided with a receiving chamber therein for receiving a blade base. The receiving chamber is provided on each of opposing sides thereof with a U-shaped notch for receiving a shaft. The U-shaped notch and an inner wall of the receiving chamber jointly form a groove for receiving a conductive plate. The receiving chamber is provided with clamping blocks at an upper end and a -shaped through-hole at a lower end thereof for urging against a stop block of the blade base and for retaining unto a flange of the rear lid. The blade base is provided with two blades at a front end thereof, and the shafts at each of opposing ends thereof. The shafts are each formed with an annular grove at a top end thereof. The blade base is made by integrally riveting the blades to the shafts and includes the two stop blocks and a protruding block. The two conductive plates are wired to the circuit board. Each of the conductive plates is provided at a front end thereof with a semi-circular through-hole for being riveted to the annular groove of the shaft. The rear lid covers and urges against the blade base after placing the blade and the conductive plates into the receiving chamber. The rear lid is provided with a through-hole at each of opposing ends thereof, through which through-holes the conductive plates penetrate. The rear lid includes a guide block at a center thereof to allow sliding movement of the protruding block of the blade base. Each of the through-holes and the guide block are provided with a push block therebetween for urging against the shafts.

As such, the blades can be rotated within a 90° range. Further, the blades are prevented from disengagement upon experiencing a frontal or a lateral impact. This invention is also simple in its structure so as to reduce the manufacturing and assembly cost.

LIST OF REFERENCE NUMERALS

Figure 1:
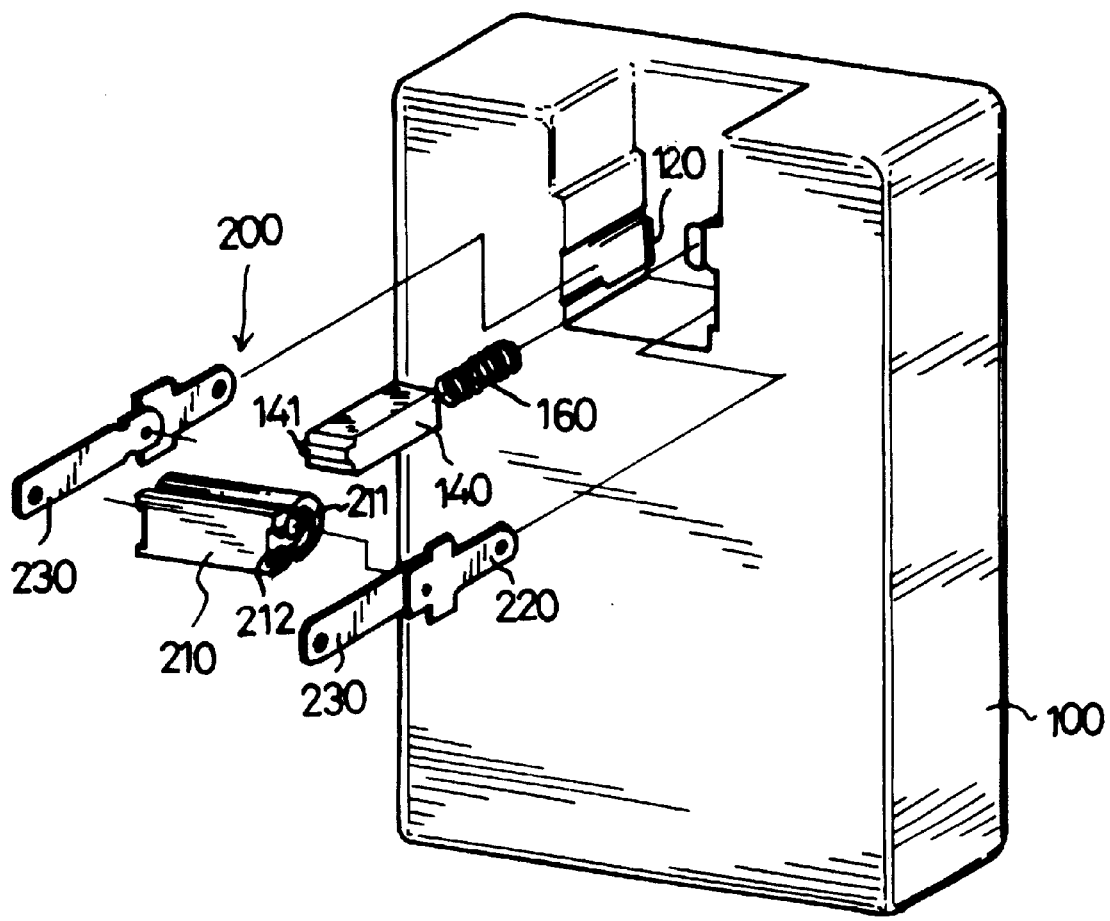
FIG. 1 is an exploded view showing the embodiment of ROC (Taiwan) Patent Application No. 82201253.
Figure 2:
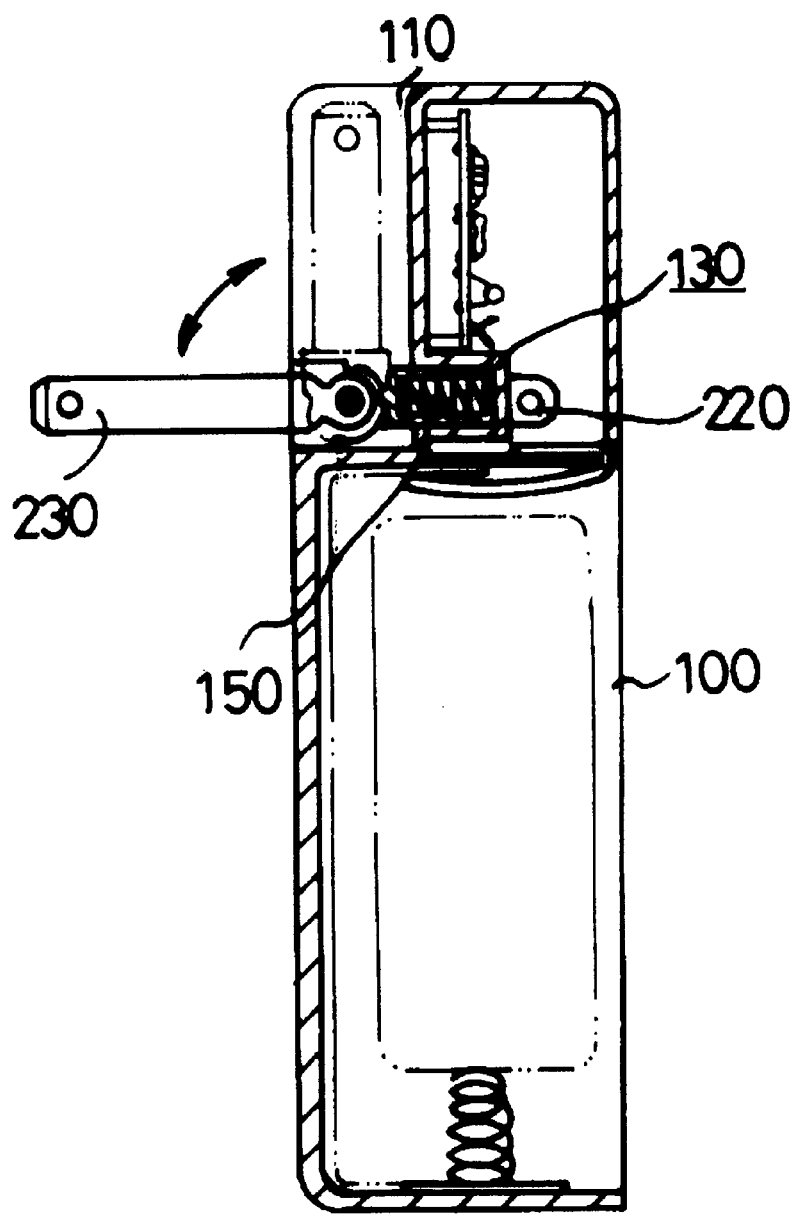
FIG. 2 is a cross-sectional view showing the embodiment of ROC (Taiwan) Patent Application No. 82201253.

100 housing
110 notch 120 openings
130 receiving slot
140 urging element
141 protrusion
150 blind hole
160 spring
200 plug structure
210 horizontal shaft
211 groove
212 keyways
220 coupling plates
230 blades
300 upper lid
400 lower lid
410 receiving chamber
420 U-shaped notch
430 groove
440 clamping block
450 -shaped through-hole
451 lower urging portion
452 upper urging portion
460 outer receiving chamber
500 blade bade
510 blade
520 shaft
521 annular groove
530 stop block
540 protruding block
600 conductive plates
610 semi-circular through-hole
700 rear lid
710 through-hole
720 guide block
730 push block
740 peg
750 horizontal through-hole

DETAILED DESCRIPTIONS OF EMBODIMENTS

A preferred embodiment accompanied with the drawings is explained, in details, as follows so as to clearly disclose this invention.

Figure 3:
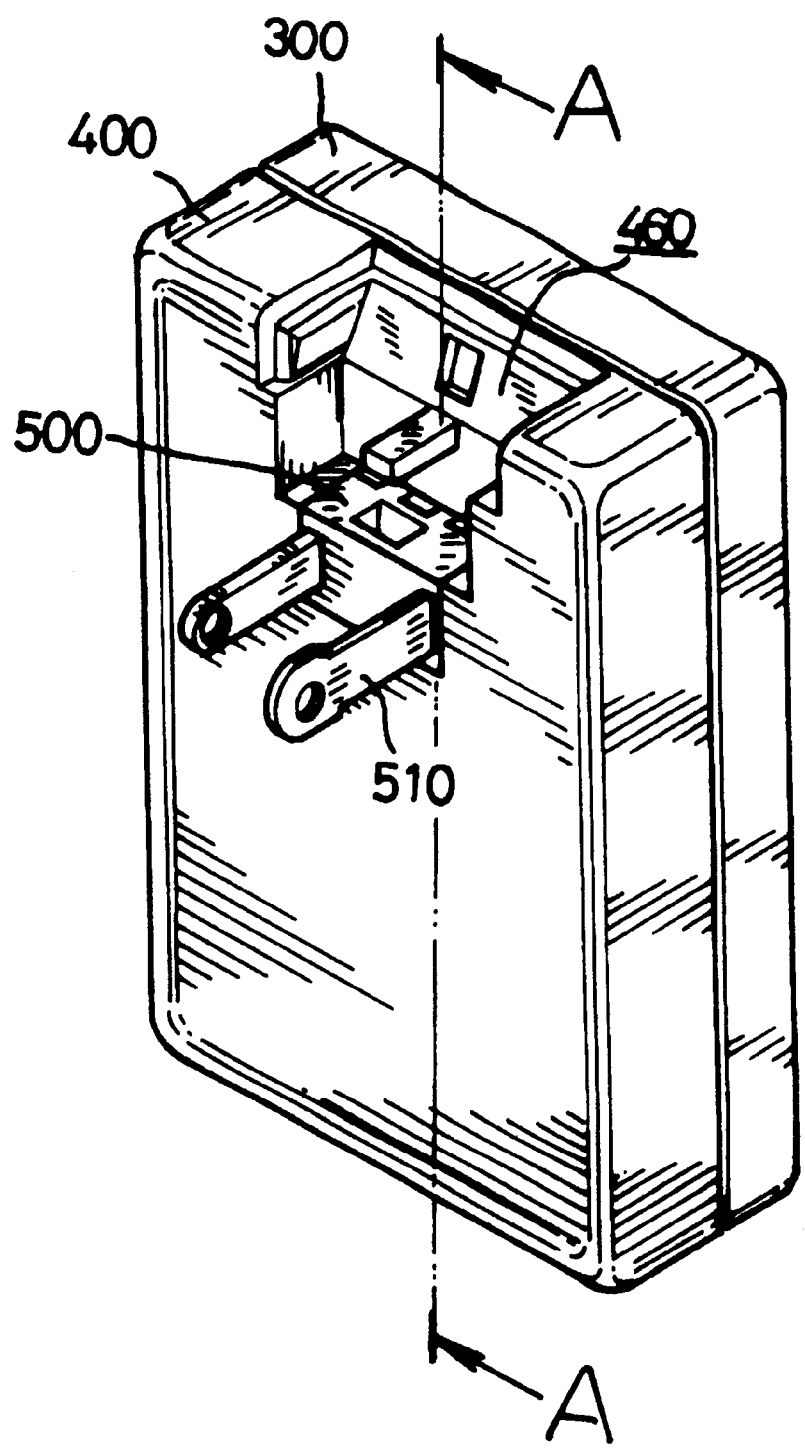
FIG. 3 is a perspective, assembled view of this invention.
Figure 4:
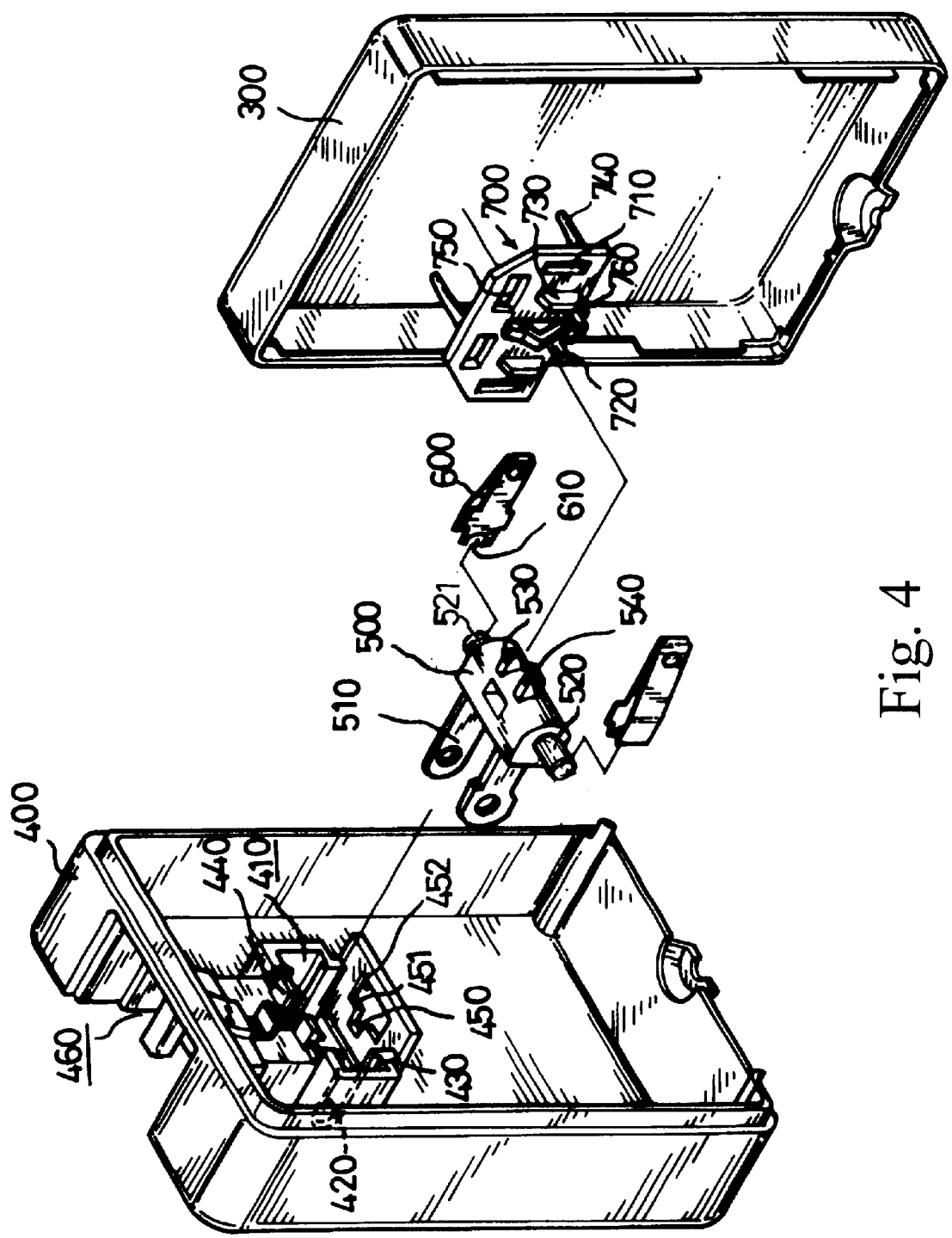
FIG. 4 is a perspective, exploded view of this invention.

FIG. 3 is a perspective, assembled view of this invention; FIG. 4 is a perspective, exploded view of this invention. As shown in FIGS. 3 and 4, the structure of this invention comprises: an upper lid 300 to be matched with a lower lid 400 so as to receive a circuit board (not shown) therein, the lower lid 400 being provided with an outer receiving chamber 460 for receiving blades 510, and a receiving chamber 410 therein for receiving a blade base 500. The receiving chamber 410 is provided on each of opposing sides thereof with a U-shaped notch 420 for receiving a shaft 520. The U-shaped notch 420 and an inner wall of the receiving chamber 410 jointly form a groove 430 for receiving a conductive plate 600. The receiving chamber 400 is provided with clamping blocks 440 at an upper end and a -shaped through-hole 450 at a lower end thereof for urging against a stop block 530 of the blade base 500 and for retaining unto a flange 760 of the rear lid 700. The blade base 500 is made of plastic material and is provided with two blades 510 at a front end thereof, and the shafts 520 at each of opposing ends thereof. The shafts 520 are each formed with an annular grove 521 at a top end thereof. The blade base 500 is made by integrally riveting the blades 510 to the shafts 520 and includes the two stop blocks 530 and a protruding block 540. The two conductive plates 600 are wired to the circuit board (not shown). Each of the conductive plates 600 is provided at a front end thereof with a semi-circular through-hole 610 for being riveted to the annular groove 521 of the shaft 520. The conductive plates are nickel-plated and folded into a V-shaped configuration to enhance conductivity. The rear lid 700 covers and urges against the blade base 500 after placing the blade 500 and the conductive plates 600 into the receiving chamber 410. The rear lid 700 is provided with a through-hole 710 at each of opposing ends thereof, through which through-holes 710 the conductive plates 600 penetrate. The rear lid 700 includes a guide block 720 at a center thereof to allow sliding movement of the protruding block 540 of the blade base. The guide block 720 is substantially bugled so as to allow the blades 710 to be retained at three different positions while rotating. Each of the through-holes 710 and the guide block 720 are provided with a push block 730 therebetween for urging against the shafts 520. After covering the rear lid 700, the clamping blocks 440 each pass through and clasp unto a horizontal through-hole 750. The flange 760 passes through the -shaped through-hole 450 and urges against an upper urging portion 452 so as to tightly secure the rear lid 700 to the receiving chamber 410. The rear lid 700 is further provided at a rear face thereof with three pegs 740 that are in direct contact with an inner wall of the upper lid 300 so as to enhance resistance to a frontal impact applied to the blade base.

As such, the blades 510 can be rotated within a 90° range and retained to three different retaining positions. Further, the blades 510 are prevented from disengagement upon experiencing a frontal or a lateral impact. This structure is also simple in its structure so as to reduce the manufacturing and assembly cost.

Figure 5A:
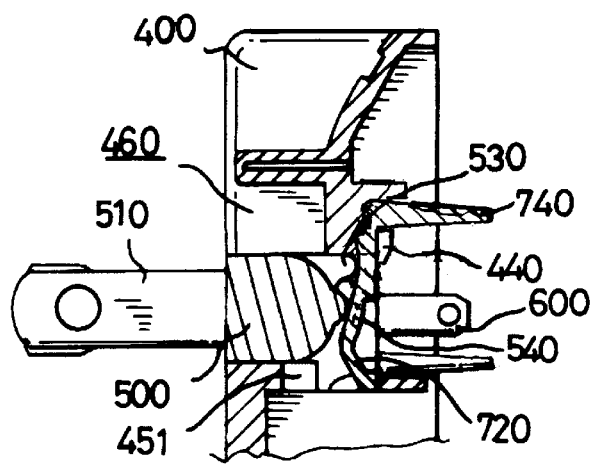
FIG. 5A is a cross-sectional view taken along lines A—A of FIG. 3, showing the blades in their first retaining positions.
Figure 5B:
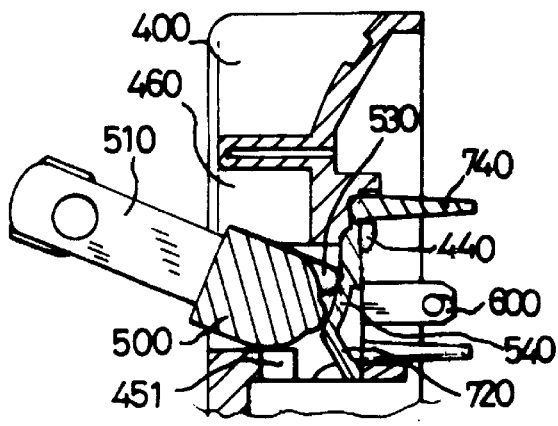
FIG. 5B is a cross-sectional view taken along lines A—A of FIG. 3, showing the blades in their second retaining positions.
Figure 5C:
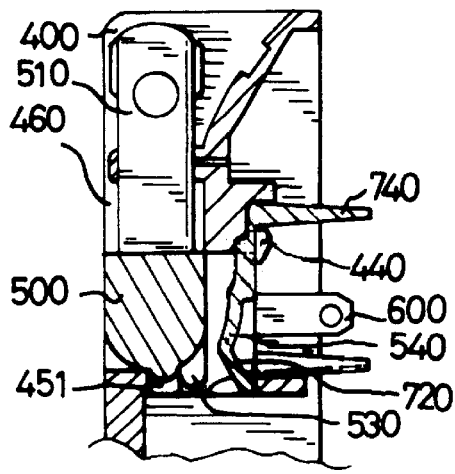
FIG. 5C is a cross-sectional view taken along lines A—A of FIG. 3, showing the blades in their third retaining positions.

With reference to FIGS. 5A, 5B, and 5C that depict the operational schematic views while flipping the blades 510, wherein FIG. 5A is a cross-sectional view taken along lines A—A of FIG. 3, showing the blades in their first retaining positions. As shown in FIG. 5, the stop blocks 530 urge against a lower end of the clamping blocks 440 so as to prevent the blades from further downward flipping motion. Only a force of approximately 0.25 Kg is required for a user to flip the blades 510 upwards so as to drive the protruding block 540 of the blade base 500 to slide along the guide block 720.

FIG. 5B is a cross-sectional view taken along lines A—A of FIG. 3, showing the blades in their second retaining positions. Under this state, the protruding blocks 540 slide along the guide block 720, along with rotation of the blades 510. The guide block 720 will bend slightly due to its lower rigidity so as to allow smooth sliding movement. The operational life span is approximately increased to 6,000 cycles due to the different rigidity between the protruding block 540 and the guide block 720. A force of approximately 1.25 Kg is required for the user to flip the blades 510 upwards to their storage state (as shown in FIG. 5C). Therefore, when the user intends to insert the plug of this invention (in the state of FIG. 5A) into a receptacle (not shown), if there is any slight deviation in orientation so as to let the blades to assume a state as shown in FIG. 5B, the user only needs to slightly adjust the blades in order to smoothly recover the blades to the state as shown in FIG. 5A rather than forcing the blades to the state as shown in FIG. 5C.

FIG. 5C is a cross-sectional view taken along lines A—A of FIG. 3, showing the blades in their third positions. Under this state, the stop block 530 urges against the lower urging portion 451 so as to prevent the blades from further flipping movement, and the blades 510 and the blade base 500 are entirely received in the outer receiving chamber 460 in the storage state. To use this invention, the user only needs to flip the blades 510 outwards.

From the invention thus described, it will be obvious that this invention as described above is provided for explanation and that the invention may be varied in many ways, where such variations are not to be regarded as departing from the spirit and scope of the invention, and all such modifications as would be obvious to one skilled in the art are intended for inclusion within the scope of the following claims.

What is claimed is:

1. A rotary charging plug structure of a charger, comprising:

an upper lid to be matched with a lower lid so as to receive a circuit board therein;

a lower lid being provided with a receiving chamber therein for receiving a blade base, the receiving chamber being provided on each of opposing sides thereof with a U-shaped notch for receiving a shaft, the U-shaped notch and an inner wall of the receiving chamber jointly forming a groove for receiving a conductive plate, the receiving chamber being provided with an urging portion at an upper end and a retaining portion at a lower end thereof for urging against a stop block of the blade base and for retaining unto a flange of the rear lid;

a blade base being provided with two blades at a front end thereof, and the shafts at each of opposing ends thereof, the shafts being each formed with an annular grove at a top end thereof, wherein the blade base is made by integrally riveting the blades to the shafts and includes the two stop blocks and a protruding block;

two conductive plates being wired to the circuit board, each of the conductive plates being provided at a front end thereof with a semi-circular through-hole for being riveted to the annular groove of the shaft; and a rear lid covering and urging against the blade base after placing the blade and the conductive plates into the receiving chamber, the rear lid being provided with a through-hole at each of opposing ends thereof, through which through-holes the conductive plates penetrate, the rear lid including a guide block at a center thereof to allow sliding movement of the protruding block of the blade base, each of the through-holes and the guide block being provided with a push block therebetween for urging against the shafts;

whereby the blades can be rotated within a 90° range, the blades are prevented from disengagement upon experiencing a frontal or a lateral impact, failure caused by environmental humidity is eliminated, and the manufacturing and assembly cost is reduced.

2. The rotary charging plug structure of a charger of claim 1, wherein the guide block is bugled so as to allow the blades to be retained at three different positions while rotating.

3. The rotary charging plug structure of a charger of claim 1, wherein the rear lid is further provided at a rear face thereof with three pegs that are in direct contact with an inner wall of the upper lid so as to enhance resistance to a frontal impact applied to the blade base.

4. The rotary charging plug structure of a charger of claim 1, wherein the blade base is made of plastic material.

5. The rotary charging plug structure of a charger of claim 1, wherein the conductive plates are nickel-plated.

6. The rotary charging plug structure of a charger of claim 1, wherein the conductive plates are folded into a V-shaped configuration to enhance conductivity.

* * * * *